United States Patent [19]

Zhao et al.

[11] Patent Number: 5,759,951
[45] Date of Patent: Jun. 2, 1998

[54] HYDROGENATION DEMETALIZATION CATALYST AND PREPARATION THEREOF

[75] Inventors: Yusheng Zhao; Jiahuan Wang; Zhiwu Wang; Xilai Liu; Jingchun Shao; Xiaojing Chen; Wei Li; Shaowu Wang, all of Liaoning, China

[73] Assignees: Fushun Research Institute of Petroleum and Petrochemicals; China Petro-Chemical Corporation, both of Beijing, China

[21] Appl. No.: 696,387

[22] Filed: Nov. 21, 1995

[30] Foreign Application Priority Data

Nov. 22, 1994 [CN] China ............................. 94118303.3
Nov. 22, 1994 [CN] China ............................. 94118334.3

[51] Int. Cl.$^6$ ................................................. B01J 23/04
[52] U.S. Cl. .................. 502/344; 502/414; 502/415; 502/355; 502/346; 502/348; 502/330; 502/208; 502/243
[58] Field of Search ......................... 502/414, 415, 502/355, 344, 346, 348, 330, 208, 243

[56] References Cited

U.S. PATENT DOCUMENTS

| 4,066,574 | 1/1978 | Tamm ........................... 252/439 |
| 4,741,821 | 5/1988 | Hung et al. .................. 208/251 H |
| 4,830,736 | 5/1989 | Hung et al. ...................... 208/251 |
| 5,102,852 | 4/1992 | Hung et al. ...................... 502/314 |
| 5,137,859 | 8/1992 | Fujikawa et al. ................ 502/206 |
| 5,139,648 | 8/1992 | Lambert .......................... 208/111 |
| 5,187,133 | 2/1993 | Yoshinari et al. ................ 502/66 |
| 5,384,297 | 1/1995 | Prada et al. ...................... 502/66 |

FOREIGN PATENT DOCUMENTS 1052888  12/1990  China.

OTHER PUBLICATIONS

Limbach et al., AIChe Journal, Feb. 1988, pp. 305–313, "Effect of Nonuniform Activity on Hydrometallation Catalyst".

*Primary Examiner*—Walter D. Griffin
*Assistant Examiner*—Nadine Preisch
*Attorney, Agent, or Firm*—Renner, Otto, Boisselle & Sklar

[57] ABSTRACT

Disclosed is a hydrogenation demetalization catalyst with a stabilized alkali metal, having a). an alumina carrier,
 b). 0.01–10.2% by weight of an alkali metal,
 c). 0–3.0% by weight of a Group VIB element, and
 d). 0–3.0% by weight of a Group VIII element of the periodic table of elements, with a pore volume of 0.4–1.3 ml/g, a surface area of 100–230 m$^2$/g, comprising a nonmetallic element selected from the group consisting of P, Si, B and F with the atomic ratio of said nonmetallic element to said alkali metal being 0.5–40.0. Also disclosed is a process for preparing the same.

16 Claims, No Drawings

HYDROGENATION DEMETALIZATION CATALYST AND PREPARATION THEREOF

FIELD OF THE INVENTION

The present invention relates to a hydrogenation demetalization catalyst and preparation thereof, in particular, to hydrogenation demetalization catalyst comprising an alumina carrier, an alkali metal a nonmetallic element selected from the group consisting of P, Si, B and F, and optionally a Group VIB element and/or a Group VIII element of the periodic table of elements, and preparation thereof.

BACKGROUND OF THE INVENTION

In the petroleum processing industry, as the crude oil gets increasingly heavier, the identity and amount of metals (such as Na, Fe, Ca, Ni and V) in crude oil are increasing. These metals are primarily present in the form of organo-metal and tend to deposit on the pore openings and outer surfaces of the catalyst, giving rise to rapid decrease of the catalyst activity as well as the quick rise of the pressure drop across the catalyst bed.

U.S. Pat. No. 4,741,821 discloses a process for decalcification of petroleum by a nickel-containing catalyst, while U.S. Pat. No. 4,830,736 discloses the use of a similar catalyst for removing calcium and sodium from crude oil. In recent years, several hydrogenation demetalization (HDM) catalysts have been developed in order to protect the highly active downstream hydro-desulfurization catalyst, hydrodenitrogenation catalyst and hydrogenation catalyst, with the feed material firstly contacting the hydrogenation demetalization catalyst to precipitate the metal impurities from the feed material, then passing onto the said downstream catalyst beds. The hydrogenation demetalization catalysts are all characterized by large pore size to facilitate the metal impurities' entrance into the catalyst pores. However, Ca and Fe included in the feed material preferentially deposit on the void space between the HDM catalyst particles, while Ni and V tend to deposit near the outer surface of the HDM catalyst praticles, thus limiting the capacity of the LDM catalyst to further accommodate metal impurities, and what is worse, the pressure drop across the HDM catalyst bed increases rapidly and the reactor becomes blocked.

K. W. Limbach and James Wei (see AICh E journal, 34(2), 305.February 1988) found that the capacity of the hydrogenation demetalization catalyst to accommodate metal impurities could be substantially increased by reduction of said catalyst activity on the outer edge.

Both U.S. Pat. No. 5,102,852 and Chinese Patent Application Nos. 90110192.3 disclose a process for removing calcium and sodium from the hydrocarbon material, and the catalyst system used is made up of two stages, the first stage comprises an alkali metal supported over alumina, while the second stage of catalyst comprises an alkali metal, a Group VIB element and/or a Group VIII element of the periodic table of elements supported over alumina. Unfortunately, such catalysts suffer from disadvantages in that the alkali metal tends to run off under process conditions. The catalysts is thus rendered to lose activity and modification effect in the first stage and the second stage respectively, and the lost alkali metal pollutes the downstream catalysts.

SUMMARY OF THE INVENTION

An object of the present invention is to provide a hydrogenation demetalization catalyst with a stabilized alkali metal, particularly, to provide a hydrogenation demetalization catalyst, having a). an alumina carrier,
  b). 0.01–10.2% by weight of an alkali metal,
  c). 0–3.0% by weight of a Group VIB element, and
  d). 0–3.0% by weight of a Group VIII element of the periodic table of elements, with a pore volume of 0.4–1.3 ml/g, a surface area of 100–230 m$^2$/g, comprising a nonmetallic element selected from the group consisting of P, Si, B and F with the atomic ratio of said nonmetallic element to said alkali metal being, 0.5–40.0.

A further object of the present invention is to provide a hydrogenation demetalization catalyst most suitable for removing Na and Ca from the crude oil, having a). an alumina carrier, and
  b). 0.2–10.2% by weight of an alkali metal, with a pore volume of 0.4–1.3 ml/g, a surface area of 100–230 m$^2$/g, comprising a nonmetallic element selected from the group consisting of P, Si, B and F with the atomic ratio of said nonmetallic element to said alkali metal being, 0.5–10.0.

A still further object of the present invention is to provide a hydrogenation demetalization catalyst most suitable for removing Na, Ca, Fe, V and Ni from the crude oil, having, a). an alumina carrier,
  b). 0.01–0.8% by weight of an alkali metal,
  c). 1.0–3.0% by weight of a Group VIB element, and/or
  d). 0.5–3.0% by weight of a Group VIII element, with a pore volume of 0.45–0.80 ml/g, a surface area of 100–230 m$^2$/g, comprising a nonmetallic element selected from the group consisting of P, Si, B and F with the atomic ratio of said nonmetallic element to said alkali metal being 0.5–40.0.

A still further object of the present invention is to provide a catalyst system for hydrogenation demetalization of crude oil, said catalyst system is made up of two stages of catalyst, comprising a first stage of catalyst, having
  a). an alumina carrier, and
  b). 0.2–10.2% by weight of an alkali metal, with a pore volume of 0.4–1.3 ml/g, a surface area of 100–230 m$^2$/g, and a second stage of catalyst, having
  a). an alumina carrier,
  b). 0.01–0.8% by weight of an alkali metal,
  c). 1.0–3.0% by weight of a Group VIB element, and/or
  d). 0.5–3.0% by weight of a Group VIII element of the periodic table of elements, with a pore volume of 0.45–0.80 ml/g, a surface area of 100–230 m$^2$/g wherein both said first stage of catalyst and said second stage of catalyst have a nonmetallic element selected from the group consisting of P, Si, B and F with the atomic ratios of said nonmetallic element to said alkali metal being 0.5–10.0 and 0.5–40.0 respectively.

A still further object of the present invention is to provide a process for the preparation of a hydrogenation demetalization catalyst, comprising a). Spraying an aqueous solution containing an alkali metal and a nonmetallic element selected from the group consisting of P, Si, B and F upon an alumina carrier, drying at 100°–120° C. for 1–15 h, heating at a rate of 150°–250° C./h to 700°–1000° C. and calcining at a temperature within this range for 1–5 h, cooling; then optionally spraying an aqueous solution containing a Group VIB element and/or a Group VIII element of the periodic table of elements upon said carrier, drying at 100°–120° C. for 1–5 h, heating at a rate of 100°–200° C./h to 450°–550° C. and calcining at a temperature within this range for 1–5 h to give a catalyst; or b). Optionally spraying an aqueous solution containing a Group VIB element and/or a Group VIII element upon an alumina carrier, then spraying an aqueous solution containing an alkali metal and a nonmetallic element selected from the group consisting of P, Si, B and F upon said carrier, drying at 100°–120° C. for 1–15 h, heating at a rate of 150°–250° C./h to 700°–1100° C. and calcining at a temperature within this range for 1–5 h to give a catalyst ; or c). Optionally spraying an aqueous solution containing a Group VIB element and/or a Group VIII element upon an alumina carrier containing a said nonmetallic element, then spraying an aqueous solution containing an alkali metal upon said carrier, drying at 100°–120° C. for 1–5 h, heating at a rate of 150°–250° C./h to 700°–1100° C. and calcining at a temperature within this range for 1–5 h to give a catalyst.

DETAILED DESCRIPTION OF THE INVENTION

The hydrogenation demetalization catalyst according to the present invention comprises an alkali metal, a nonmetallic element selected from the group consisting of P, Si, B and F, and optionally a Group VIB element and/or a Group VIII element supported over an alumina carrier. It has a pore volume of 0.4–1.3 ml/g, a surface area of 100–230 $m^2/g$.

As used herein, all the contents of the components present in the catalyst are given in percentage based upon the weight of the alumina carrier.

The alkali metal used in the invention is Li, Na, K, Rb or Cs, or a mixture thereof, and K is the preferred. The content of alkali metal in the catalyst of the invention is, based upon the carrier, 0.01–10.2% by weight, and preferably 0.05–3.0% by weight. The alkali metal can be present in the bulk or at the outer edge of the catalyst. The alkali metal is primarily present at the outer edge of the catalyst when a Group VIB element and/or a Group VIII element are present, and in such a case; the alkali metal is preferably present at a level of 0.05–0.3% by weight.

The nonmetallic element used in the present invention is selected from the group consisting of P, Si, B and F, and preferably P. The atomic ratio of the nonmetallic element to the alkali metal present in the catalyst of the invention is 0.5–40.0, and preferably 1.0–3.0. The nonmetallic element can be present at the outer edge or in the bulk of the catalyst, and stabilize the alkali metal.

The Group VIB element is, for example, Cr, Mo or W, preferably Mo, present in an amount of 0–3.0% by weight based upon the carrier, while the Group VIII element is, for example, Fe, Co, Ni, Rh, Pt or Pd, Preferably Ni, present in an amount of 0–3.0% by weight based upon the carrier.

The alumina carrier suitable for the present invention is a transitional alumina, for example, $\gamma$-$Al_2O_3$, $\delta$-$Al_2O_3$, $\chi$-$Al_2O_3$, $\eta$-$Al_2O_3$, with $\gamma$-$Al_2O_3$ being the preferred, any precursor that can be turned into a transitional alumina, especially $\gamma$-$Al_2O_3$, can also be suitable. The carrier usually has a pore volume of 0.5–1.45 ml/g and a surface area of 200–400 $m^2/g$.

In one embodiment of the invention, there is provided a hydrogenation demetalization catalyst most suitable for removing Na and Ca from the crude oil, said catalyst has a). an alumina carrier, and b). 0.2–10.2% by weight of an alkali metal, with a pore volume of 0.4–1.3 ml/g, a surface area of 100–230 $m^2/g$, said catalyst comprises a nonmetallic element selected from the group consisting of P, Si, B and F with the atomic ratio of said nonmetallic element to said alkali metal being, 0.5–10.0. In such a catalyst, the content of the alkali metal is preferably 1.0–3.0% by weight, and the atomic ratio of said nonmetallic element to said alkali metal is preferably 1.0–2.0. The alkali metal can be present in the bulk of the catalyst or at the outer edge of the catalyst.

In a further embodiment of the invention, there is provided a hydrogenation demetalization catalyst most suitable for removing Na, Ca, Fe, V and Ni from the crude oil, said catalyst has a). an alumina carrier, b). 0.01–0.8% by weight of an alkali metal, c). 1.0–3.0% by weight of a Group VIB element, and/or d). 0.5–3.0% by weight of a Group VIII element, with a pore volume of 0.45–0.80 ml/g, a surface area of 100–230 $m^2/g$, said catalyst comprises a nonmetallic element selected from the group consisting of P, Si, B and F with the atomic ratio of said nonmetallic element to said alkali metal being 0.5–40.0. In such a catalyst, the content of the alkali metal is preferably 0.05–0.30% by weight, and the atomic ratio of said nonmetallic element to said alkali metal is preferably 1.0–3.0.

In a preferred embodiment of the present invention, there is provided a catalyst system for hydrogenation demetalization of a crude oil. Said catalyst system is made up of two stages of catalyst, and comprises a first stage of catalyst and a second stage of catalyst, wherein the first stage of catalyst comprises an alkali metal and a non-metallic element selected form the group consisting of P, Si, B and F, supported over said carrier, and the second stage of catalyst comprises an alkali metal, a said nonmetallic element, a Group VIB element and/or a Group VIII element supported over said carrier. The feed material firstly contacts the first stage of catalyst, then contacts the second stage of catalyst.

To prepare the present catalyst, the components can be applied to the carrier by spraying, impregnation or any other suitable technique, with spraying being the preferred.

To prepare the present catalyst, one can firstly spray an aqueous solution containing an alkali metal and a nonmetallic element upon the carrier, and optionally spray an aqueous solution containing a Group VIB element and/or a Group VIII element, or one can also firstly optionally spray an aqueous solution containing a Group VIB element and/or a Group VIII element upon said carrier, then introduce alkali metal and a desired nonmetallic element into the carrier. Alkali metal and nonmetallic element can be introduced simultaneously or introduced one after another, and the introduction sequence is not critical. One can also use a carrier containing desired nonmetallic element, in such a case, the step for introducing corresponding nonmetallic element is eliminated.

The alkali metal is preferably introduced into the carrier in the form of aqueous solution of a soluble salt, such as nitrate, carbonate, sulphate, halide, phosphate, silicate, borate of a corresponding metal.

The nonmetallic element is preferably applied to the carrier in the form of an aqueous solution containing the same. Such a solution can be one of phosphoric acid, water glass, silicate and boric acid and fluoride etc. Preferably is the aqueous solution of a compound composed of a alkali metal cation and an anion containing said nonmetallic element, such compound can be listed, for example, phosphate, hydrogen phosphate, dihydrogen phosphate, silicate, borate, fluoride of ah alkali metal. The amount of water used to prepare such a solution is 2–10% by volume of the water that the carrier can adsorb.

An aqueous solution containing a Group VIB and/or a Group VIII element is usually used herein to introduce said element(s) into the carrier. Such a solution can be formulated by dissolving a soluble salt of the corresponding element(s) in 90–98% by volume of the water that the carrier can adsorb. The soluble salt can be listed, for example, nitrate, sulphate etc, with nirtate being the preferred.

Prior to putting into use, the present catalyst is usually moulded into a form of pellet, particle and any other form suitable for fixed bed operation. The catalyst of the present invention usually undergoes hydrogenation demetalization at 300°–400° C. under a hydrogen partial pressure of 5–30 MPa.

Under industry operation, the present catalyst is kept from losing the alkali metal owing to the stabilization effect brought about by said nonmetallic element, the pollution of the downstream catalysts by the lost alkali metal is thus avoided.

The present invention will be described in more detail by way of nonlimiting examples below.

EXAMPLE 1

200 grams of an anhydrous $\gamma$-$Al_2O_3$ with a pore volume of 1.2 ml/g and a surface area of 267 $m^2$/g (BET) (available from No.3 Refinery of Fushun, P. R. China) are placed in a rotary spraying drum. 240 ml of an aqueous solution containing 21.0 grams of $KH_2PO_4$ is sprayed upon the $\gamma$-$Al_2O_3$, while the drum is rotating. When the spraying is over, the drum is kept rotating for 30 minutes, then allowed to stand for 10 hours. A layer (less than 4 cm thick) of the wet catalyst precursor produced is spread over an enamelled tray and dried at 110° C. for 2 hours. Then, the dried catalyst precursor is heated to 950° C. at a rate of 200° C./h in an oven and calcined at this temperature for 3 hours to give catalyst A.

EXAMPLE 2

De-ionized water is added to a mixture of 10.8 grams of potassium chloride and 27 grams of 53% (by weight) aqueous phosphoric acid solution until the volume of the final solution is 240 ml. The solution is evenly sprayed upon 200 grams of an anhydrous $\gamma$-$Al_2O_3$ with a pore volume of 1.2 ml/g and a surface area of 267 $m^2$/g (BET) in a rotary spraying drum while the drum is rotating. Thereafter, the wet catalyst precursor is treated in the same procedures as in Example 1 to give catalyst B.

EXAMPLE 3

104 ml of an aqueous solution containing 15 grams of $KNO_3$ is sprayed upon 200 grams of phosphorus-containing $\gamma$-$Al_2O_3$ with a pore volume of 0.521 ml/g, a surface area of 379 $m^2$/g (BET) and a phosphorus content of 2.7% (available from No.3 Refinery of Fushun, P. R. China) in a rotary spraying drum while the drum is rotating. Thereafter, the wet catalyst precursor is treated in the same procedures as in Example 1 to give catalyst C.

EXAMPLE 4

The catalyst is prepared in the same procedures as in Example 1 except that the calcining temperature is 760° C. The resulting catalyst is designated as catalyst D.

EXAMPLE 5

The catalyst is prepared in the same procedures as in Example 2 except that the amount of phosphoric acid is 13.5 grams instead of 27 grams. The resulting catalyst is designated as catalyst E.

EXAMPLE 6

21.0 grains of $KH_2PO_4$ powder is added to 300 grams of dry pseudoboehmite powder (manufactured by a carbondioxide neutralization process, and available from Qilu Petrochemical company, P. R. China) and mixed thoroughly. Then is added 246 ml of an aqueous solution containing 3.2% by weight of nitric acid. The mixture is kneaded to become plastic, followed by being extruded into φ4.2 mm extrudate in an extruder. After drying at 110° C. for 2 hours, the extrudate are heated to 950° C. at a rate of 200° C./h in an oven and calcined at this temperature for 3 hours to give catalyst F.

EXAMPLE 7

240 ml of an aqueous solution containing 15.4 grams of $KNO_3$ and 11.3 grams of $H_3BO_3$ is sprayed upon 200 grams of an hydrous $\gamma$-$Al_2O_3$ with a pore volume of 1.2 ml/g and a surface area of 267 $m^2$/g (BET) in a rotary spraying drum while the drum is rotating. Thereafter, the drum is kept rotating for 30 minutes, then allowed to stand for 10 hours. A layer less than 4 cm thick of the wet catalyst precursor produced is spread over an enamelled tray and dried for 2 hours at 110° C. The dried catalyst precursor is heated to 950° C. at a rate of 200° C./h in an oven and calcined at this temperature for 3 hours to give catalyst G.

EXAMPLE 8

240 ml of an aqueous solution containing 15.2 grams of $KNO_3$ and 5.5 grams of $NH_4F$ is sprayed upon 200 grams of an anhydrous $\gamma$-$Al_2O_3$ with a pore volume of 1.2 ml/g and a surface area of 267 $m^2$/g (BET) in a rotary spraying drum while the drum is rotating. Thereafter, the wet catalyst precursor is treated in the same procedures as in Example 7 to give catalyst H.

EXAMPLE 9

The catalyst is prepared in the same procedures as in Example 8 except that the amount of $NH_4F$ is 2.75 grams instead of 5.5 grams. The resulting catalyst is designated as catalyst I.

EXAMPLE 10

The catalyst is prepared in the same procedures as in Example 8 except that the amount of $KNO_3$ is 16.2 grams instead of 15.2 grams and the amount of $NH_4F$ is 34.6 grams instead of 5.5 grams. The resulting catalyst is designated as catalyst J.

EXAMPLE 11

The catalyst is prepared in the same procedures as in Example 8 except that the calcining temperature is 760° C. The resulting catalyst is designated as catalyst K.

EXAMPLE 12

8 ml of an aqueous solution containing 1 gram of $KH_2PO_4$ is sprayed evenly upon 200 grams of an anhydrous $\gamma$-$Al_2O_3$ carrier with a pore volume of 0.85 ml/g and a surface area of 249 m²/g in a rotary spraying drum over a period of at least 10 minutes while the drum is rotating. Thereafter, the drum is kept rotating for 20 minutes. The carrier is then dried at 110° C. for 5 hours, heated to 950° C. at a rate of 200° C./h in an oven, and calcined at this temperature for 3 hours. The carrier is allowed to cool, then placed in the drum again. 170 ml of an aqueous solution containing 20 grams of Ni(NO$_3$)$_2$·6H$_2$O is sprayed upon the carrier treated as above. Thereafter, the drum is kept rotating for 30 minutes. A layer (less than 3 cm thick) of the wet catalyst precursor is spread over a steel tray and dried at 110° C. for 10 hours, then is heated to 480° C. at a rate of 160° C./h in an oven and calcined at this temperature for 3 hours to give catalyst L.

EXAMPLE 13

200 grams of the same carrier as used in Example 12 is placed in a rotary spraying drum. 162 ml of an aqueous solution containing 7.5 grams of ammonium molybdate is sprayed upon the carrier while the drum is rotating. Thereafter, the drum is kept rotating for 30 minutes. Then, 8 ml of a solution containing 0.50 gram of phosphoric acid and 0.51 gram of potassium nitrate is slowly sprayed over a period of at least 10 minutes. When spraying is finished, a layer (less than 3 cm thick) of the wet catalyst precursor is spread over a steel tray, dried at 110° C. for 10 hours, then heated to 950° C. at a rate of 200° C./h and calcined at this temperature for 3 hours to give catalyst M.

EXAMPLE 14

99 ml of a solution containing 20 grams of Ni(NO$_3$)$_2$·6H$_2$O is sprayed upon 200 grams of a phosphorus-containing γ-Al$_2$O$_3$ carrier with a pore volume of 0.521 ml/g, a surface area of 379 m²/g and a phosphorus content of 2.7% by weight in a rotary spraying drum. Thereafter, the drum is kept rotating for 30 minutes. 5.2 ml of solution containing 0.52 gram of potassium nitrate is sprayed evenly upon the carrier over a period of at least 10 minutes. After the spraying is finished, the catalyst precursor is treated in the same procedures as in Example 13 to give catalyst N.

Chemical and physical properties of the catalysts A–N prepared according to the present invention are shown in the following table 1. The contents of potassium and nonmetallic element are measured by a inductively coupled plasma spectrometer and a chromometer respectively.

TABLE 1

| | Chemical and physical properties of the catalysts A–N | | | | | | | | | | | | | |
|---|---|---|---|---|---|---|---|---|---|---|---|---|---|---|
| catalyst No. | A | B | C | D | E | F | G | H | I | J | K | L | M | N |
| pore volume, ml/g(Hg) | 1.1 | 1.1 | 0.49 | 1.2 | 1.1 | 0.68 | 1.1 | 1.1 | 1.1 | 1.0 | 1.2 | 0.65 | 0.70 | 0.50 |
| surface area, m²/g(BET) | 135 | 140 | 138 | 209 | 138 | 161 | 135 | 137 | 134 | 140 | 210 | 134 | 138 | 133 |
| Ni, % by weight | / | / | / | / | / | / | / | / | / | / | / | / | 1.90 | 1.93 |
| Mo, % by weight | / | / | / | / | / | / | / | / | / | / | / | / | 1.98 | / |
| K, % by weight | 2.8 | 2.8 | 2.8 | 2.8 | 2.8 | 2.8 | 2.8 | 2.8 | 2.8 | 2.8 | 2.8 | 0.138 | 0.095 | 0.098 |
| atomic ratio of non-metal to potassium | P/K = 1 | P/K = 1 | P/K = 1.2 | P/K = 1 | P/K = 0.5 | P/K = 1 | B/K = 1.2 | F/K = 1 | F/K = 0.5 | F/K = 5.8 | F/K = 1 | P/K = 1 | P/K = 1.01 | P/K = 34.0 |

Comparative Example 1

The comparative catalyst A' is prepared according to the method for preparing a potassium-containing catalyst disclosed in Chinese Patent Application No. CN90110192.3.

Comparative Example 2

The comparative catalyst B' is prepared according to the method for preparing a nickel-containing catalyst disclosed in Chinese Patent Application No. CN90110192.3.

Comparative Example 3

The comparative catalyst C' is prepared according to the method for preparing a potassium-containing catalyst disclosed in Chinese Patent Application No. CN90110192.3 except that 16.8 grams of potassium dihydrogen phosphate is used instead of 12.1 grams of potassium nitrate and that the catalyst is calcined at 950° C. for 3 hours.

EXAMPLE 15

15 grams of each catalyst A, B, C, D, E, F, G, H, I, J, K and A' is added to 100 ml of de-ionized water (pH 6.91) in a beaker. After standing for 1 hours, the PH in each beaker is measured by a PH meter at once. The results are given in table 2.

TABLE 2

| catalyst | A | B | C | D | E | F | G | H | I | J | K | A' |
|---|---|---|---|---|---|---|---|---|---|---|---|---|
| K, % by weight | 2.8 | 2.8 | 2.8 | 2.8 | 2.8 | 2.8 | 2.8 | 2.8 | 2.8 | 2.8 | 2.8 | 2.8 |
| atomic ratio of | P/K = 1 | P/K = 1 | P/K = 1.2 | P/K = 1 | P/K = 0.5 | P/K = 1 | B/K = 1.2 | F/K = 1 | F/K = 0.5 | F/K = 5.8 | F/K = 1.0 | 0 |

TABLE 2-continued

| catalyst | A | B | C | D | E | F | G | H | I | J | K | A' |
|---|---|---|---|---|---|---|---|---|---|---|---|---|
| non-metal to K | | | | | | | | | | | | |
| PH after 1 hr. | 7.80 | 8.02 | 8.21 | 7.83 | 9.89 | 7.80 | 9.06 | 7.54 | 8.89 | 7.37 | 7.63 | 10.28 |

As indicated in Table 2, alkali metal potassium in the comparative catalyst A' is substantially dissolved in de-ionized water, for the PH value of the de-ionized water rises from 6.91 to 10.28. On the contrary, potassium in B- or F- or P-containing catalysts prepared according to the invention is stabilized to various extent that the PH values of de-ionized water with the present catalyst is apparently lower than that with catalyst A' after 1 hour, especially when the atomic ratio of non-metal to potassium is not less than 1.

EXAMPLE 16

For comparision, catalyst A according to the invention and comparative catalyst A' are tested for 200 hours in a small-scale hydrogenation reactor under the same operating conditions. The results are shown as follows.

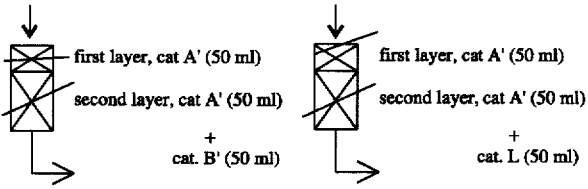

| impurity feed | product oil 1 | product oil 2 |
|---|---|---|
| S, % 2.46 | 1.99 | 2.99 |
| Fe, ppm 27.6 | 2.32 | 2.04 |
| V, ppm 5.30 | 3.61 | 3.63 |
| Ni, ppm 42.4 | 32.0 | 31.7 |
| Ca, ppm 53.0 | 20.7 | 19.8 |
| Na, ppm 4.18 | 2.01 | 1.18 |
| K, ppm 0.87 | 7.25 | 2.15 |

As shown by the results, compared with catalyst without phosphorus, the catalyst prepared according to the invention effectively prevents potassium from runing off, and has better effect on removing sodium.

EXAMPLE 17

150 ml of each catalyst G, H, I, J, K, A' and C' is loaded respectively in a small scale fixed-bed hydrogenation reactor. Evaluations are carried out for 200 hours. The results are as follows.

| Catalyst | G | H | I | J | K | A' | C' |
|---|---|---|---|---|---|---|---|
| amounts of catalyst loaded | | | | 150 ml | | | |
| operation conditions | $H_2$ partial pressure: | | | 14.7 Mpa | | | |
| | temperature: | | | 380° C. | | | |
| | liquid space velocity: | | | 0.5 hr$^{-1}$ | | | |
| | ratio of $H_2$ to oil: | | | 1000(v/v) | | | |
| content of K in feed oil, ppm | | | | 0.87 | | | |
| content of K in product oil, ppm | 8.1 | 1.5 | 7.7 | 1.0 | 2.8 | 15.7 | 3.1 |

As further shown by the above results, the catalysts prepared according to the invention have significant effect on preventing potassium from running off, compared with catalysts without phosphorus, fluorine or boron.

What is claimed is:

1. A hydrogenation demetalization catalyst, having
   a). an alumina carrier,
   b). 0.01–10.2% by weight of an alkali metal,
   c). 0–3.0% by weight of a Group VIB element, and
   d). 0–3.0% by weight of a Group VIII element of the periodic table of elements,
   said catalyst comprising a pore volume of 0.4–1.3 ml/g, a surface area of 100–230 m²/g, comprising a nonmetallic element selected from the group consisting of P, Si, B and F with the atomic ratio of said nonmetallic element to said alkali metal being 0.5–40.0.

2. A catalyst of claim 1, having
   a). an alumina carrier, and
   b). 0.2–10.2% by weight of an alkali metal,
   said catalyst comprising a pore volume of 0.4–1.3 ml/g, a surface area of 100–230 m²/g, comprising a nonmetallic element selected from the group consisting of P, Si, B and F with the atomic ratio of said nonmetallic element to said alkali metal being 0.5–10.0.

3. A catalyst of claim 2, comprising 1.0–3.0% by weight of an alkali metal.

4. A catalyst of claim 2, wherein the atomic ratio of said nonmetallic element to said alkali metal is 1.0–2.0.

5. A catalyst of claim 1, having
   a). an alumina carrier,
   b). 0.01–0.8% by weight of an alkali metal,
   c). 1.0–3.0% by weight of a Group VIB element, and/or
   d). 0.5–3.0% by weight of a Group VIII element,
with a pore volume of 0.45–0.80 ml/g, a surface area of 100–230 $m^2/g$, comprising a nonmetallic element selected from the group consisting of P, Si, B and F with the atomic ratio of said nonmetallic element to said alkali metal being 0.5–40.0.

6. A catalyst of claim 5, comprising 0.05–0.3% by weight of an alkali metal.

7. A catalyst of claim 5, wherein the atomic ratio of said nonmetallic element to said alkali metal is 1.0–3.0.

8. A catalyst system for hydrogenation demetalization of crude oil, made up of two stages of catalyst, comprising two zones of catalyst, each containing a separate catalyst, wherein said first zone of catalyst comprises
   a). an alumina carrier,
   b). 0.02–10.2% by weight of an alkali metal, and wherein said first zone of catalyst comprises a pore volume of 0.4–1.3 ml/g, a surface area of 100–230 $m^2/g$; wherein said first zone of catalyst has a nonmetallic element selected from the group consisting of P, Si, B and F with the atomic ratio of said nonmetallic element to said alkali metal being 0.5–10.0 and wherein said second zone of catalyst comprises
   a). an alumina carrier,
   b). 0.01–0.8% by weight of an alkali metal,
   c). 1–3.0% by weight of a Group VIB element; and/or
   d). 0.5–3.0% by weight of a Group VIII element,
   and wherein said second zone of catalyst comprises a pore volume of 0.45–0.80 ml/g, a surface area of 100–230 $m^2/g$; wherein said second zone of catalyst has a nonmetallic element selected from the group consisting of P, Si, B and F with the atomic ratio of said nonmetallic element to said alkali metal being 0.5–40.0.

9. A catalyst of claim 1, wherein said alumina is $\gamma$-$Al_2O_3$.

10. A catalyst of claim 1, wherein said alkali metal is potassium.

11. A catalyst of claim 1, wherein said nonmetallic element is phosphorus.

12. A catalyst of claim 1, wherein said Group VIB element is Mo.

13. A catalyst of claim 1, wherein said Group VIII element is Ni.

14. A process for preparing a hydrogenation demetalization catalyst, comprising one of
   a). spraying an aqueous solution containing an alkali metal and a nonmetallic element selected from the group consisting of P, Si, B and F upon an alumina carrier, drying at 100°–120° C. for 1–5 h, heating at a rate of 150°–200° C./h to 700°–1100° C. and calcining at a temperature within this range for 1–5 h, cooling; then optionally spraying an aqueous solution containing a Group VIB element and/or Group VIII element upon said carrier, drying at 100°–120° C. for 1–5 h, heating at a rate of 100°–200° C./h to 450°–550° C. and calcining at a temperature within this range for 1–5 h to give a catalyst;
   b). spraying an aqueous solution containing a Group VIB element and/or a Group VIII element upon an alumina carrier, then spraying an aqueous solution containing an alkali metal and a nonmetallic element from the group consisting of P, Si, B and F upon said carrier, drying at 100°–120° C. for 1–5 h, heating at a rate of 150–250° C./h to 700°–1100° C. and calcining at a temperature within this range for 1–5 h to give a catalyst; and
   c). spraying an aqueous solution containing a Group VIB element and/or a Group VIII element upon an alumina carrier containing a said nonmetallic element, then spraying an aqueous solution containing an alkali metal upon said carrier, drying at 100°–1200° C. for 1–15 h, heating at a rate of 150°–250° C./h to 700°–1100° C. and calcining at a temperature within this range for 1–5 h to give a catalyst.

15. A catalyst of claim 1, comprising 0.05–3.0% by weight of an alkali metal.

16. A catalyst of claim 1, wherein the atomic ratio of said nonmetallic element to said alkali metal is 1.0–3.0.

* * * * *